United States Patent [19]
Paris et al.

[11] 3,867,402
[45] Feb. 18, 1975

[54] 1-METHYL-4,5-DI(P-METHOXYPHENYL)-6H-PYRROLO(2,3-C) PYRAZOLE

[75] Inventors: Gerard Yvon Paris, Duvernay, Quebec, Canada; Leo Ralph Swett, Waukegan, Ill.

[73] Assignee: Abbott Laboratories, North Chicago, Ill.

[22] Filed: Mar. 15, 1973

[21] Appl. No.: 341,444

[52] U.S. Cl. ............................. 260/310 R, 424/273
[51] Int. Cl. ............................................. C07d 57/02
[58] Field of Search ................................. 260/310 R

[56] References Cited
UNITED STATES PATENTS
3,701,785  10/1972  Swett et al. ...................... 260/310 R

OTHER PUBLICATIONS

Grandberg et al. Chem. Abst. Vol. 62, column 16256 (1965), QD1.A51.

*Primary Examiner*—Natalie Trousof
*Attorney, Agent, or Firm*—Robert L. Niblack; Joyce R. Krei

[57] ABSTRACT

1-Methyl-4,5-di(p-methoxyphenyl)-6H-pyrrolo [2,3-c]pyrazole, which is useful as an anti-inflammatory agent, as well as methods for preparing the compound.

1 Claim, No Drawings

1-METHYL-4,5-DI(P-METHOXYPHENYL)-6H-PYRROLO(2,3-C) PYRAZOLE

DETAILED DESCRIPTION OF THE INVENTION

This invention relates to 1-methyl-4,5-di(p-methoxyphenyl)-6H-pyrrolo[2,3-c]pyrazole, represented by the formula

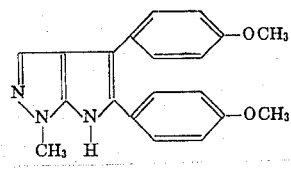

A number of humans and animals are known to suffer from various rheumatic conditions involving inflammation, swelling, tenderness, decreased mobility, pain and fever. While there are a number of presently available anti-inflammatory agents which have been found to be effective in symptomatic treatment of conditions such as rheumatoid arthritis, rheumatoid spondylitis, degenerative joint disease of the hip, and the like. Such agents have a number of undesirable side effects. Thus, the search for improved anti-inflammatory agents continue.

The present invention provides one such agent.

The compound of this invention, 1-methyl-4,5-di(p-methoxyphenyl)-6H-pyrrolo[2,3-c]pyrazole, is useful as an anti-inflammatory agent when administered to mammalian patients in dosages of from 10 to 50 mg./kg. of body weight daily, preferably in divided doses, i.e., 3 to 4 times daily.

The anti-inflammatory activity of the compound was established in the carrageenan rat paw edema test as described by Winter, et al., *Proc. Soc. Exp. Biol. Med.* 111, 554 [1962].

The following example will further illustrate this invention.

EXAMPLE 1

A solution of p-anisoin (29.95 g., 0.11 mole), 1-methyl-5-aminopyrazole (9.71 g, 0.10 mole) and p-toluenesulfonic acid monohydrate (1.1 g, 0.0058 mole) in benzene (150 ml.) was refluxed under nitrogen atmosphere for 5 hours using a Barrett trap to collect the water formed. The reaction mixture was filtered and the filtrate was evaporated to dryness to yield an oil (32.5 g.). A part of this oil was dissolved in alcohol and treated with ethanolic picric acid. 5-[α-p-Methoxybenzoyl)-p-methoxybenzylamino]-1-methylpyrazole picrate melted at 185°–186° turned red.

Analysis Calcd. for $C_{26}H_{24}N_6O_{10}$: C, 53.79; H, 4.17; N, 14.48

Found: C, 54.07; H, 4.26; N, 14.65

The crude oil (37 g.) was treated with aniline (36.3 g., 0.39 mole) and aniline hydrobromide (10.4 g., 0.06 mole). The stirred reaction mixture was heated to 110°C. for 17 hours. The reaction mixture was cooled, dissolved in 500 ml. of methanol and then treated with 200 ml. of amberlite IRA-400 resin in the OH form (previously washed with methanol). The resin was filtered and the filtrate was concentrated to a small volume to yield 15 g. of the product as a solid, m.p. 221°–223°

Analysis Calcd. for $C_{20}H_{19}N_3O_2$: C, 72.05; H, 5.74; N, 12.60; O, 9.60

Found: C, 72.08; H, 5.85; N, 12.61; O, 9.97

The compounds of the present invention can be incorporated into various pharmaceutically acceptable dosage forms such as tablets, capsules, pills, suspensions and the like for immediate or sustained release, by combining them with suitable carriers or diluents according to methods well known in the art. In addition to the active agent and the pharmaceutically acceptable carrier or diluent, the dosage forms may additionally include various excipients, binders, fillers, lubricating agents, flavoring and sweetening agents and the like. However, in the case of, for example filled capsules, the compound can be the sole ingredient.

We claim:

1. The compound, 1-methyl-4,5-di(p-methoxyphenyl)-6H-pyrrolo[2,3-c]pyrazole.

* * * * *